May 21, 1935.  F. R. SWANSON  2,002,442
ROTATABLE WORK TABLE
Filed Nov. 28, 1932
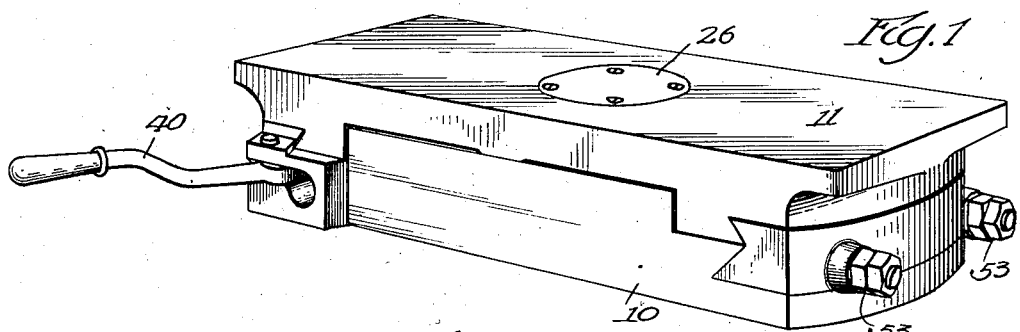
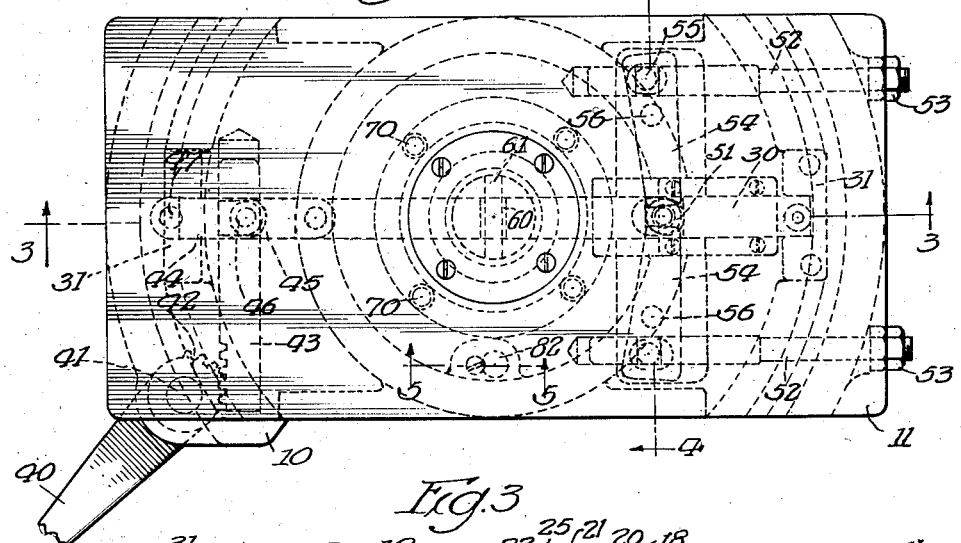
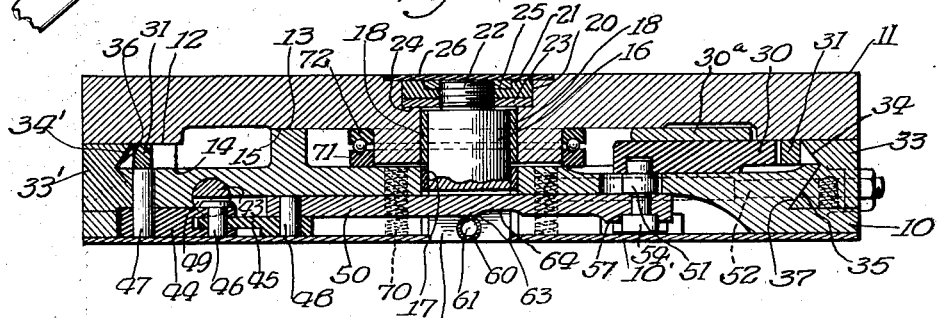
Inventor
Fred R. Swanson Patented May 21, 1935

2,002,442

UNITED STATES PATENT OFFICE 2,002,442

ROTATABLE WORK TABLE

Fred R. Swanson, Rockford, Ill., assignor to Sundstrand Machine Tool Co., Rockford, Ill., a corporation of Illinois Application November 28, 1932, Serial No. 644,638

7 Claims. (Cl. 90—58)

The invention relates generally to a rotatable work table, and more particularly to a table adapted to be locked in a plurality of angularly disposed positions.

Work tables of the type contemplated generally comprise a base adapted to be secured to the work carriage of a milling or other type of machine, and a table rotatable upon the base and arranged to be locked to the base in two or more angularly disposed positions. The rotatable table serves as a support on which milling fixtures or holding devices can be mounted. It provided with two locking positions 180° apart, these fixtures can be mounted in pairs so that a milling operation may be performed upon the work held in one fixture while the other fixture is loaded or unloaded in the diametrically opposed position, and after the milling operation is completed the table may be rotated so as to transfer the newly loaded fixture to the active work supporting or milling position, and the first fixture to the unloading position. This permits of a removal and replenishing of one fixture during a cutting operation on a work piece held in the other, and provides for practically continuous milling.

It is the general object of the invention to provide a new and improved work table of this character which is of rugged construction and which incorporates efficient means for locking the table relative to its base and for clamping the table to the base so as to prevent vibration and chattering.

It is another object of the invention to provide a rotatable work table with new and improved means to raise the table from its seat to permit the table to be shifted from one position to another with a minimum amount of effort.

Another object is to provide a new and improved table of this character with clamping means at the center and one end for securing the table to the base, means for locking the table against rotation, and a single hand lever for actuating said means.

A further object of the invention is to provide a new and improved rotatable work table with means at the center and at one end, closely adjacent the work to clamp the table to its base.

Further objects and advantages of the invention will become apparent as the description proceeds.

In the drawing:

Fig. 1 is a perspective view of a preferred form of the invention.

Fig. 2 is a plan view thereof.

Fig. 3 is a vertical section approximately along the line 3—3 of Fig. 2.

Fig. 4 is a section approximately along the line 4—4 of Fig. 2.

Fig. 5 is a section approximately along the line 5—5 of Fig. 2.

While I have shown in the drawing and shall herein describe in detail a preferred embodiment of the invention, it is to be understood that I do not thereby intend to limit the invention to the specific form disclosed, but aim to cover all modifications and alternative constructions falling within the spirit and scope of the invention as expressed in the appended claims. Although a table having but two index positions is illustrated, it is obvious that any desired number of such positions may be provided.

In the form illustrated in the drawing the invention comprises generally a base 10 somewhat rectangular in form adapted to be secured onto the work carriage of a machine, as, for example, the work table of a milling machine. A table 11 is rotatable upon the base, annular bearing surfaces 12 and 13 on the under side of the table being adapted to slide upon upper annular bearing surfaces or seats 14 and 15 on the base. The table is centered by means of a pivot pin 16 which extends through a sleeve bearing 17 secured to the base and a sleeve bearing 18 secured to and rotatable with the table. The upper end of the pin 16 extends into a recess 20 formed in the table and has a head comprising a nut 21 screw threaded onto a reduced portion 22 thereof and a thrust collar 23 positioned intermediate the nut and the bottom surface or shoulder 24 of the recess. Preferably a lock nut 25 is provided fitting into a recess in the nut 21, and the recess 20 is closed by means of a cover plate 26.

In the present form the table 11 is adapted to be rotated about the pin 16 from one index position to another and to be locked in either of its diametrically opposed positions. In addition to a locking bolt 30, which is slidably mounted in a channel guide 30ᵃ on the base and arranged to engage either one of two recessed locking members 31 carried on opposite ends of the table 11, the invention provides means for clamping one end of the table rigidly to the base when in its locked position. This means is herein disclosed as comprising an arcuate clamping member 33 positioned at the right-hand end (Figs. 1 to 3) of the base 10. The inner side of this clamping member is V-grooved to form clamping surfaces 34 and 35, the clamping surface 34 being arranged to engage corresponding bevelled surfaces 36 on the table while the surface 35 is arranged to engage a correspondingly bevelled surface 37 on the base 10. As described more fully hereinafter, the clamping member 33 is arranged to be moved toward the pivot pin for the purpose of clamping the table onto the base, and is arranged to be loosened and moved away from the pivot pin for the purpose of releasing the table. Simultaneously with the application of the clamping member 33 the pivot pin 16 is arranged to be drawn downwardly to clamp the center of the table, thus rigidly connecting the right-hand portion of the table with the base, it being this portion of the table which carries the work about to be operated upon while a finished work piece is being removed from the other end of the table.

The locking member 30 referred to hereinbefore is slidably mounted in the base for movement longitudinally thereof and is arranged to be actuated by means including a hand lever 40 which is pivotally mounted on a vertical pin 41 in the forward left-hand corner of the base 10. The means connecting the lever 40 to the lock bolt 30 is herein disclosed as comprising a segmental gear 42 formed on the inner end of the lever 40, a rack bar 43 slidable transversely in the base 10 and having teeth engaging said gear, a pair of toggle links 44 and 45, a bar 50 and a pin 51. The toggle links are connected together by means of a pivot pin 46. The other end of the link 44 is anchored to the base by means of a pin 47 and the other end of the link 45 is connected to the adjacent end of the bar 50 by means of a pin 48. The rack bar 43 is provided with a transverse slot 49 into which the upper end of the pin 46 extends so that by moving the rack bar 43 transversely of the base the toggle links may be actuated to reciprocate the bar 50. The pin 51 is secured at its lower end to the bar 50 and at its uper end to the locking member 30 so that the bar 50 and member 30 move together.

The clamping means for the table is preferably operated simultaneously with the locking member and, as illustrated herein, is arranged to be operated by the locking member operating means. Thus the clamping member 33 is secured to the outer end of a pair of laterally spaced and longitudinally extending rods 52 which are slidably mounted in the base 10 and extend through apertures in the member 33. The outer ends of these rods are provided with suitable nuts 53 and the inner ends are connected to a pair of levers 54 by means of vertical pins 55 which are carried on the outer ends of the levers and project into transversely extending slots in the rods 52. The levers 54 are pivotally mounted on the base 10 by means of pins 56. The inner ends of the levers 54 engage in a transversely extending slot 57 in the bar 50. In this way upon reciprocating the locking bolt the levers 54 are oscillated and the clamping member 33 actuated.

The means for drawing the pivoted pin 16 downwardly to clamp the central portion of the table is also operable by the bar 50 and is herein disclosed as comprising a horizontal and transversely extending roller 60 carried on a pin 61 secured to the lower end of the pin 16 which is bifurcated by means of a slot 62. The bar 50 extends through the slot 62 of the pin and has a cam surface 63 thereon arranged, when th locking bolt is engaged with a member 31, to force the roller 60, and thereby the pin 16, downwardly to clamp the central portion of the table to the base. Upon withdrawing the locking bolt the roller 60 recedes into a groove 64 in the bar 50.

In order to facilitate the rotation of the table from one index position to another, the table is preferably raised slightly from the base when the clamping means is disengaged, thus separating the table surfaces 12 and 13 from the base supporting surfaces 14 and 15. As illustrated herein this separation of the table from the base is accomplished by means of a plurality of coiled springs 70 which are positioned in vertical bores in the base 10 and engage the lower race 71 of a ball thrust bearing, the upper race 72 of which is positioned against the lower surface of the table. The lower ends of the coiled springs 70 rest on a bottom plate portion 10' of the base. It will be readily apparent that when the clamping means is released the coiled springs will act through the ball thrust bearing to raise the table, whereupon the table may be rotated readily since it is then carried entirely on the ball bearing. In the exemplary form of the invention, an arcuate member 33' is secured to the end of the base 10 opposite the clamping member and has a bevelled surface 34' spaced from the table surface 36 to provide clearance to permit the table to be raised by the springs 70.

To facilitate locating the table in the proper position to engage the locking bolt with the locking member, a detent device may be provided, as illustrated in Figs. 2 and 5. This detent device comprises a hollow plunger 76 positioned in a recess in the base and normally urged upwardly by means of a coiled spring 78, the upward movement of the plunger being limited by the head of a screw 79. The upper end of the plunger is provided with a diametrically positioned vertical stop surface 80 and a bevelled upper surface 81, and is arranged to engage the lower end of a stop pin 82 which projects downwardly from the table 11. This stop pin has a correspondingly oppositely positioned vertical stop surface and a bevelled end surface 84 so that when the table is rotated in a clockwise direction (Fig. 2) the bevelled surfaces 81 and 84 engage to depress the plunger 76 until the pin 82 passes the plunger. The table is then rotated in a reverse direction to engage the stop surfaces which are properly positioned to locate the locking bolt 30 in alinement with the recess in the locking member 31.

I claim as my invention:

1. A rotatable work support comprising, in combination, a base, a table rotatable thereon, a pivot pin for centering the table and movable axially for clamping the table to the base, an arcuate clamping member at one end of the base having a V-groove on its inner side arranged to engage correspondingly bevelled surfaces on the table and base, a pair of rods slidable longitudinally in the base having their outer ends secured to said member, a pair of levers pivotally mounted on said base each having one end connected to one of said rods, a bar extending centrally of said base through a bifurcated portion of said pivot pin connected to said levers and reciprocable to engage and disengage said clamping member, and means on said bar arranged to operate said pivot pin to clamp the center of the table simultaneously with the engagement of the clamping member with the end of the table.

2. A rotatable work support comprising, in combination, a base, a table rotatable thereon, a pivot pin for centering the table, an arcuate clamping member at one end of the base having a V-groove on its inner side arranged to engage correspondingly bevelled surfaces on the table and base, a pair of rods slidable longitudinally in the base having their outer ends secured to said member, a pair of levers pivotally mounted on said base each having one end connected to one of said rods, a bar extending centrally of said base connected to said levers and reciprocable to engage and disengage said clamping member, and means operable by said bar to lock the table against rotation simultaneously with the engagement of the clamping member with the end of the table.

3. A rotatable work support comprising, in combination, a base, a table rotatable thereon, a pivot pin for centering the table and movable axially for clamping the table to the base, an arcuate clamping member at one end of the base having a V-groove on its inner side arranged to engage correspondingly bevelled surfaces on the table and base, a slidable operating bar extending longitudinally through said base and through a recess in said pivot pin, means connecting said bar and clamping member so that when the bar is moved in one direction the clamping member is tightened, and cam means on said bar arranged to operate said pivot pin to clamp the center of the table simultaneously with the engagement of the clamping member with the end of the table.

4. A rotatable work support comprising, in combination, a base, a table rotatable thereon, a pivot pin for centering the table and movable axially for clamping the table to the base, clamping means at one end of the base operable to clamp one end of the table to the base, means for actuating said clamping means comprising a pair of laterally spaced and parallel members extending longitudinally of the base, a pair of levers pivotally mounted on said base each having one end connected to one of said members, a bar extending centrally of said base through a bifurcated portion of said pivot pin and connected to said levers and reciprocable to engage and disengage said clamping means, cam means on said bar arranged to lower said pivot pin to clamp the center of the table simultaneously with the engagement of said clamping means, and means for operating said bar.

5. A rotatable work support comprising, in combination, a base, a table rotatable thereon, a pivot pin for centering the table and movable axially for clamping the table to the base, clamping means at one end of the base operable to clamp one end of the table to the base, means for actuating said clamping means comprising a pair of laterally spaced and parallel members extending longitudinally of the base, a pair of levers pivotally mounted on said base each having one end connected to one of said members, a bar extending centrally of said base through a bifurcated portion of said pivot pin and connected to said levers and riciprocable to engage and disengage said clamping means, cam means on said bar arranged to lower said pivot pin to clamp the center of the table simultaneously with the engagement of said clamping means, means operable by said bar for locking the table against rotation, and means for operating said bar.

6. A rotatable work support comprising in combination, a base providing a loading station and a working station, an elongated table rotatable thereon to position each end alternately at the loading and the working station, a pivot pin for centering the table movably mounted on the base, means for clamping the end of the table at the working station to the base, a bar movably mounted centrally of the base and extending longitudinally thereof, means actuated by the bar upon longitudinal movement thereof to draw the pivot pin downwardly to clamp the center of the table, means including a pair of pivoted levers disposed on opposite sides of said bar for actuating said clamping means upon longitudinal movement of said bar simultaneously with the clamping of the center of the table, an operating handle extending from said base at the loading end, means including toggle mechanism connecting said handle and the adjacent end of said bar, and means for locking the table against rotation comprising a recessed member secured to the underside of the table and a lock bolt slidably mounted on the base at the working end thereof and connected to the adjacent end of said bar accurately to position the end of the table at the working station.

7. A rotatable work support comprising in combination, a base providing a loading station and a working station, an elongated table rotatable thereon to position each end alternately at the loading and the working station, a pivot pin for centering the table movably mounted on the base, means for clamping the end of the table at the working station to the base, means for rendering said clamping means effective comprising a pair of laterally spaced members extending longitudinally in the base and movably mounted thereon operatively engaging said clamping means at their outer ends, a bar movably mounted centrally of the base and extending longitudinally thereof, and transversely extending members operatively connecting one end of said bar with said laterally spaced members so that when the bar is moved longitudinally the clamping means is rendered effective, means actuated by said bar upon longitudinal movement for drawing the pivot pin downwardly to clamp the center of the table, means for locking the table against rotation and for accurately positioning the end of the table at the working station comprising a recessed member on the underside of the table and a lock bolt adapted to be received therein slidably mounted on the base at the working end and connected to the adjacent end of the bar, and means for actuating the bar comprising a pair of link members pivotally connected at one end, one of said links being pivotally connected at its remaining end to the end of said bar, the other link being pivoted on said base in alinement with said bar, and an operating handle extending from said base operatively connected to swing said links into or out of alinement with said bar to move the same longitudinally.

FRED R. SWANSON.